G. WHITE.
CONVEYING OR SUPPLYING MECHANISM.
APPLICATION FILED JULY 19, 1913.

1,266,734.

Patented May 21, 1918.
2 SHEETS—SHEET 2.

WITNESSES:
Charles Mathé
John P. Kirby

INVENTOR
George White
BY John Lorka
ATTORNEY

UNITED STATES PATENT OFFICE.

GEORGE WHITE, OF JERSEY CITY, NEW JERSEY, ASSIGNOR TO PANAYIOTIS PANOULIAS, OF JERSEY CITY, NEW JERSEY.

CONVEYING OR SUPPLYING MECHANISM.

1,266,734.   Specification of Letters Patent.   Patented May 21, 1918.

Application filed July 19, 1913. Serial No. 779,935.

*To all whom it may concern:*

Be it known that I, GEORGE WHITE, a citizen of the United States, and a resident of Jersey City, in the county of Hudson and State of New Jersey, have invented certain new and useful Improvements in Conveying or Supplying Mechanisms, of which the following is a specification.

My invention relates to conveying mechanisms, and has for its object to provide a mechanism of this character particularly adapted to carry confections or candies, or any other goods which it may be desired to provide with a coating or ornamentation, to the machine employed for applying such coating or ornamentation.

A specific example of my invention will now be described with reference to the accompanying drawings, and the novel features will then be pointed out in the appended claims.

Figure 1:
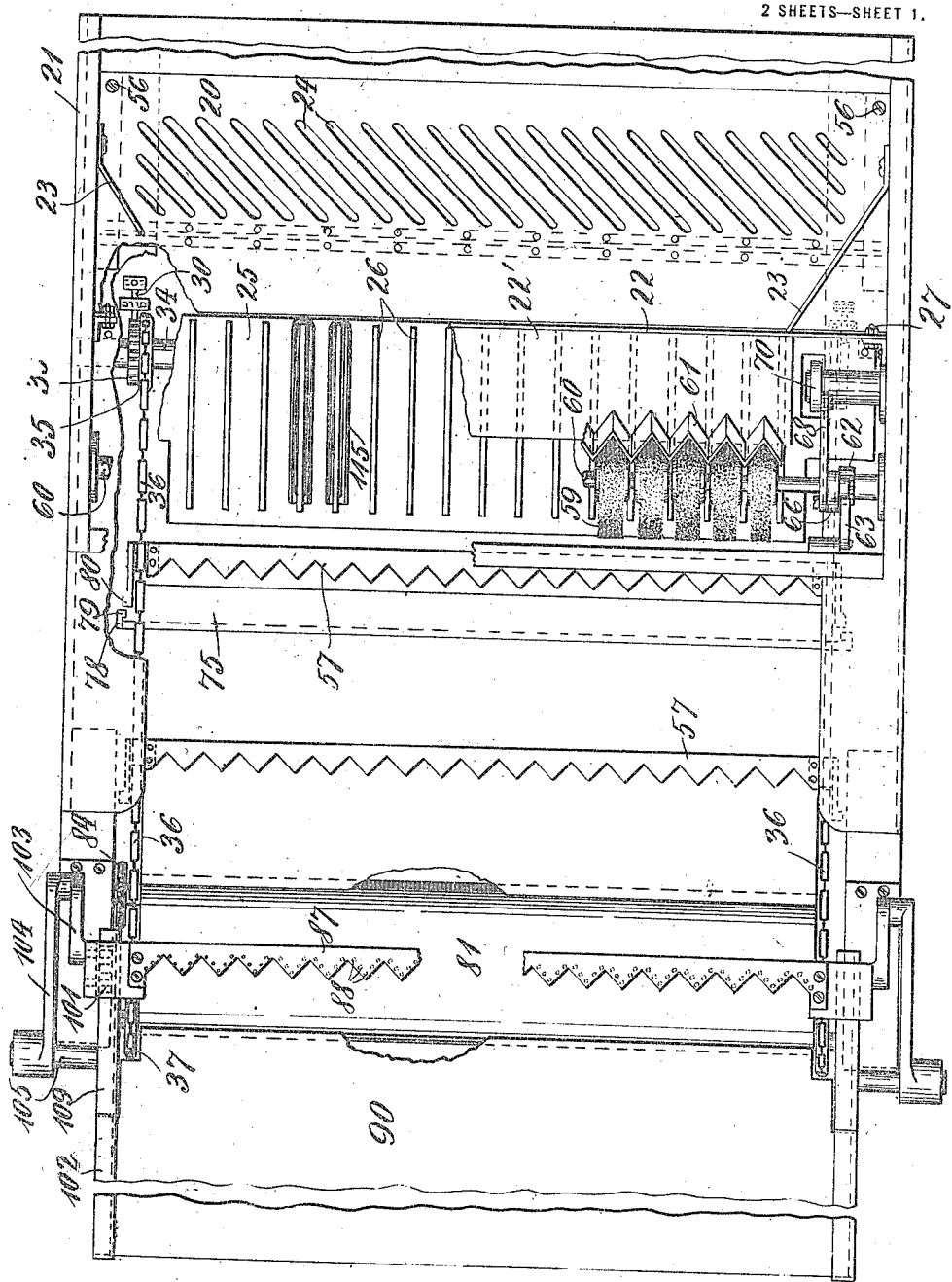
Figure 2:
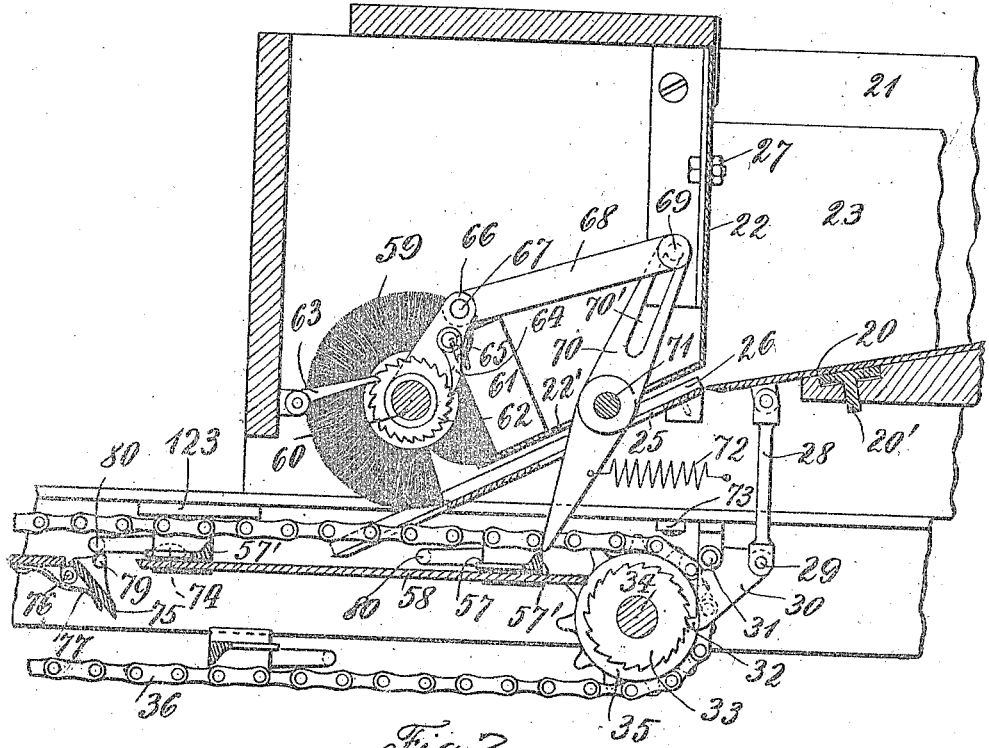

In the said drawings, Figure 1 is a plan view of the improved mechanism, with parts broken away; and Fig. 2 shows on an enlarged scale, and in a slightly different position, the parts appearing at the right-hand portion of Fig. 1.

The candies or other articles to be coated (hereinafter referred to under the generic term of "cores") are placed in a box having an inclined bottom 20, vertical side walls 21, and a transverse front wall 22 which terminates a short distance above the forward end of the bottom 20. Thus a throat or outlet is formed through which the cores may pass out of the box or container. Forwardly converging guide pieces 23 are preferably located adjacent to the side walls 21, to assist in directing the goods to the outlet. The bottom 20 is preferably made with slots 24 disposed obliquely as shown, or otherwise, these slots being for the escape of dust, surplus sugar, or any other material which should not reach the coating machine with the cores. The box is shown without any rear wall or top wall, but of course it may be constructed in other ways. Immediately adjacent to the front edge of the inclined bottom 20 is an inclined feed board 25, preferably of a steeper inclination than the bottom 20. This feed board, which is suitably secured to the frame of the machine, and preferably in such a manner as to be readily removed, is provided with a series of upwardly extending vertical longitudinal partitions or guides 26 forming individual passages for the cores. The front wall 22 constitutes a gate which will hold back any core whose height exceeds the proper dimension. The front portion 22' of this wall extends above the upper part of the feed board 25, and has certain functions set forth hereinafter. The wall 22 is preferably adjustable vertically for the purpose of adjusting the height of the throat or outlet, the well-known slot-and-set-screw, adjustment being suggested at 27. A shaking motion is preferably given to the bottom 20, which may be accomplised as follows: With the front part of said bottom, which is made of sheet-metal or other material sufficiently flexible for the purpose, is connected pivotally a link 28, the lower end of which has a like connection at 29 with a rocking piece 30 fulcrumed at 31 and provided with a tooth or pawl 32 in engagement with a ratchet wheel 33. This arrangement is provided at each side of the machine, the two ratchet wheels 33 being secured to a transverse shaft 34. This shaft also carries sprocket wheels 35 supporting chains 36, one at each side of the machine, said chains being endless and also passing, at the other end of the machine, around similar sprocket wheels 37.

Any approved mechanism (not shown) is employed for giving a suitable motion to the chains 36, generally an intermittent motion in one direction. Whenever the chains 36 move, the ratchet wheels 33, through the medium of the rocking pieces 30 and the link 28, will impart a vibrating motion to the bottom 20, this bottom being flexible as stated above, and being secured to the frame of the machine at its rear end, as by means of screws 56, so that practically the entire bottom 20 may move up and down during the vibrating motion. A strengthening rib or bar 20' may be secured to the underside of the bottom 20 at its forward portion.

Each of the chains 36 is connected at suitable intervals with cross bars 57 arranged to travel over a table 58 on which the cores drop from the feed board 25. The lower end of the feed board is at a sufficient distance from said table 58 to allow the cross bars 57 and their projections, referred to hereinafter, to pass freely. The forward edge of each cross bar 57 is notched or toothed, as shown in Fig. 1, each of the notches being in longitudinal alinement with one of the feed-board passages formed by the partitions 26. The cross bars 57 therefore will not only feed the cores toward the left on the table 58, but will also re-arrange or re-aline such cores perfectly.

The transfer of the cores from the feed board 25 to the table 58 is controlled by the following mechanism: A rotary brush or a series of brushes 59, is mounted on a shaft 60 extending transversely of the machine, the brushes being partly above the forward or lower end of the plate or forward wall portion 22', and partly above the lower end of the feed board, which latter, as described above, projects beyond the plate 22'. At the lower end of the plate 22' V-shaped partitions 61 are projected upwardly in such a position as to compress or bunch the brush bristles (see Fig. 1) in line with the longitudinal passages formed by the partitions 26. The forward end of the plate 22' has the function of holding back the bristles, as shown in Fig. 2, thus forming pockets within the several brushes 59, to receive and temporarily detain the individual cores sliding down in said passages. The V-shaped partitions 61 will prevent the bristles from spreading laterally as they are held back by the lower edge of the plate 22'. The brush shaft 60 carries a ratchet wheel 62, coöperating with a retaining pawl 63 which prevents the said shaft from turning in one direction, and also coöperating with a spring-pressed feed pawl 64 which is pivoted at 65 to an arm 66 mounted loosely on said shaft 60. At 67, the arm 66 is connected pivotally with a link 68, the other end of which has a like connection at 69 with a rocking lever 70 fulcrumed at 71. A spring 72 tends to pull the arm or lever 70 and the parts connected therewith, out of the position shown in Fig. 2 and against a suitable stop 73. The lower end of the lever 70 is adapted to be engaged periodically by projections 57' formed on or connected with, the cross bars 57, so that the lever will be swung to the position shown in Fig. 2, thereby giving a partial rotation to the brushes 59, and allowing the row of cores contained in the brush pockets to slide down onto the table 58, this transfer of the cores being assisted by the positive action of the rear bristles as they are released from the plate 22' and sweep forward to renewed engagement with the forward bristles, thus forcibly ejecting any cores that should happen to stick to the feed board 25. As soon as the lever 70 clears the projection 57' operating it, (Fig. 2), the spring 72 will restore the brush actuating mechanism to its other position (Fig. 1,) but the pawl 63 will keep the brushes stationary during this return movement. The connection 69 may be adjustable toward and from the center or fulcrum 71 of the lever 70, as by means of the radial slot 70', in order that the throw of the actuating or feed pawl 64 may be adjusted if desired.

The distance between two successive cross bars 57 is preferably approximately equal to the extent of the movement or throw given to the chains 36 at each feed stroke.

In some cases, possibly, a greater number of cores will reach the table 58 than required to fill all the notches of a cross bar 57. Such extra or surplusage cores would naturally stay in front of the row of cores held in the notches of the bar 57, the position of said row being indicated at 74 in Fig. 2. In order to eject such surplusage cores, a trap door 75, pivoted at 76 and pressed upward by a spring 77, may be located in the table 58, at a suitable distance in advance of the feed board 25. This trap door is made with upwardly extending lugs 78 provided with laterally extending pins 79 located in the path of projections 80 connected with the bars 57 and preceding them. As shown in Fig. 2, at the proper time the projections or pins 80 will engage the pins 79 and thus open the trap door 75 to discharge any cores which are in advance of the row 74. Immediately thereafter, as the pins 80 clear the pins 79, the door 75 will fly upward and close the opening in the table 58 so that said door will virtually form a part of the table, allowing the row of cores 74 to proceed over the closed door 75 to the forward portion of the table 58. It will be understood, however, that this trap door arrangement is not essential to my invention, that is to say, a continuous table 58 may be employed if preferred.

The cores being advanced intermittently in rows, as described, will finally be passed from the table 58 to any suitable transfer device (not shown), to bring the articles to an apparatus where they will receive further treatment, say a coating machine.

The operation will be understood without further detailed description. The articles are placed in the box at the right-hand end of the machine, and the vibration of the bottom 20 will not only cause any powdery foreign matter to drop through the slots 24, but will also cause the cores to arrange themselves and to move down the inclined bottom toward the outlet controlled by the transverse wall or gate 22. The cores then slide on the feed board 25, under the plate 22', through the individual passages formed by the partitions 26, and one core in each passage reaches the pocket formed in the corresponding brush 59 by the action of the plate 22' and of the partitions 61. At the next operation of the brushes, the row of cores is discharged onto the table 58; any surplus cores traveling in advance of the row will be discharged through the trap door 75 as the row 74 is advanced intermittently by the bars 57 carried by the chains 36. A stationary plate 123 serves to prevent the upper runs of the chains from being deflected upward at the time the trap door is operated. The bars 57 carry the row of cores to any suitable transfer mechanism, as mentioned above.

The machine may be adapted to cores of different height by adjusting the front wall or gate 22 and with it the plate 22', up or down. The machine may also be adjusted to receive different numbers of cores, or cores of different widths, for which purpose it will be simplest to substitute a plate 22' having a different spacing of the projections 61, a feed board 25 having its partitions 26 spaced correspondingly, another set of brushes 59, and another set of cross bars 57. All these parts are readily removable and exchangeable for this purpose. In some cases, however, it may be desired to temporarily employ the machine for cores of a smaller width than the normal, and in such cases I may employ the expedient suggested in Fig. 2, which does away with the necessity of taking out parts of the machine. U-shaped members 115 may be slipped from the box containing the articles, over the partitions 26, so as to reduce the width of the individual passages to properly guide cores of less than normal width, that is to say, of a width smaller than that for which the spacing of the partitions 26 has been designed.

Various modifications may be made without departing from the nature of my invention as set forth in the appended claims.

I claim as my invention:

1. The combination of a box having an inclined bottom, a feed board at the lower end of said bottom, means for controlling the passage of articles from said box to the feed board and mechanism for vibrating said bottom.

2. In a feed mechanism, a box having an outlet, a feed board adjacent to said outlet, a table for receiving the articles which have passed from the box over the feed board, means for arresting the articles as they pass over the feed board and arranging them in rows, and then releasing them, and means for advancing said articles along the table.

3. The combination of a box having a transverse outlet, a feed member adapted to receive the articles passing through said outlet, brushes adjacent to said feed member, and means for forming pockets in the brushes to temporarily hold the articles, and for moving the brushes to expel such articles.

4. The combination of a box having an outlet, a feed board adjacent to said outlet, a plate extending over said feed board, rotary brushes adapted to engage said plate so that some of the bristles will be held back to form pockets for the reception of articles passing through said outlet, and means for actuating said brushes.

5. The combination of a box having an outlet, a feed board adjacent to said outlet, a plate extending over said feed board, rotary brushes adapted to engage said plate so that some of the bristles will be held back to form pockets for the reception of articles passing through said outlet, and partitions projecting from said plate and adapted to confine or bunch the bristles held back by said plate.

6. The combination of a box having an outlet, a feed board adjacent to said outlet, a series of rotary brushes arranged adjacent to said feed board, and V-shaped partitions for bunching the brush bristles, substantially as set forth.

7. The combination of a box having an outlet, a feed board arranged to receive the articles passing through the outlet of said box, a series of brushes mounted to rotate above the feed board about a transversely disposed axis, a plate arranged above the feed board and adapted to hold back some of the bristles to form pockets for the reception of the articles moving over said feed board, and V-shaped partitions extending upwardly from said plate to confine or bunch the bristles thus held back.

8. The combination of a box having an outlet, a table adjacent to said box, a feed board for guiding articles from said outlet to said table, rotary brushes adjacent to said feed board, cross bars arranged to move over said table and to feed the articles lengthwise thereof, and means, operated by the movement of said cross bars, for actuating said brushes.

9. In a feed mechanism, a table, a feed board for guiding articles to said table, rotary brushes arranged adjacent to said feed board to engage the articles thereon, propelling means, movable relatively to the table, to engage the articles thereon and feed them lengthwise of the table, and means, operated by the movement of the said propelling means, for actuating said brushes.

10. In a feed mechanism, a table, a feed board for guiding articles to said table, means for forming in conjunction with said feed board, a series of passages lying side by side, and propelling bars, extending transversely over the table and movable lengthwise thereof to feed the articles on said table, said bars being provided with notches corresponding to the position of said passages and adapted to aline and space the articles transversely.

11. In a feed mechanism, a table, a feed board for guiding articles to said table, rotary brushes arranged adjacent to said feed board to engage the articles thereon, propelling means, movable relatively to said table, to engage the articles thereon and feed them lengthwise of the table, and mechanism, operated by the movement of said propelling means, for actuating said brushes, said mechanism including an adjustable connection whereby the movement of the brushes may be varied in extent while the movement of the propelling means remains unaltered.

12. In a feed mechanism, a table, a feed board for guiding articles to said table, longitudinal partitions extending upwardly from said feed board and forming in conjunction therewith, a series of passages lying side by side, U-shaped members adapted to be slipped over said partitions to reduce the width of said passages, and means for feeding the articles.

In testimony whereof, I have signed this specification in the presence of two subscribing witnesses.

GEORGE WHITE.

Witnesses:
M. L. NIMMO,
M. MARTIN.